(12) United States Patent
Terry

(10) Patent No.: US 6,865,236 B1
(45) Date of Patent: Mar. 8, 2005

(54) APPARATUS, AND ASSOCIATED METHOD, FOR CODING AND DECODING MULTI-DIMENSIONAL BIORTHOGONAL CODES

(75) Inventor: John Terry, Garland, TX (US)

(73) Assignee: Nokia Corporation, Espoo (FI)

( * ) Notice: Subject to any disclaimer, the term of this patent is extended or adjusted under 35 U.S.C. 154(b) by 649 days.

(21) Appl. No.: 09/585,202

(22) Filed: Jun. 1, 2000

(51) Int. Cl.[7] .............................................. H04L 27/10
(52) U.S. Cl. ............................................................ 375/279
(58) Field of Search ................................. 375/259, 260, 375/286, 289, 282, 279, 265, 285, 280, 341, 329; 370/206, 207, 203, 205, 204, 208, 209, 242, 243

(56) References Cited

U.S. PATENT DOCUMENTS

| | | | |
|---|---|---|---|
| 5,642,379 A | * | 6/1997 | Bremer ........................ 375/216 |
| 6,097,753 A | * | 8/2000 | Ko ............................... 375/216 |
| 6,246,698 B1 | * | 6/2001 | Kumar ......................... 370/487 |
| 6,259,728 B1 | * | 7/2001 | Sharma et al. .............. 375/223 |
| 6,272,108 B1 | * | 8/2001 | Chapman ..................... 370/226 |
| 6,298,092 B1 | * | 10/2001 | Heath et al. ................. 375/267 |
| 6,377,607 B1 | * | 4/2002 | Ling et al. ................... 375/130 |
| 6,522,700 B1 | * | 2/2003 | Zimmermann et al. ..... 375/295 |
| 6,574,283 B1 | * | 6/2003 | Sakoda et al. ............... 375/262 |
| 6,611,513 B1 | * | 8/2003 | ten Brink .................... 370/342 |
| 6,690,739 B1 | * | 2/2004 | Mui ............................. 375/265 |

* cited by examiner

Primary Examiner—Emmanuel Bayard
(74) Attorney, Agent, or Firm—Federico Fraccaroli

(57) ABSTRACT

Apparatus, and an associated method, by which to form biorthogonal codes utilized in a multi-dimensional modulation scheme. In one implementation, biorthogonal coding is provided in a cellular communication system in a manner that minimizes correlation of pairs of coordinates utilized in the communication system. Data that is to be communicated by a sending station is first modulated by a binary phase shift keying modulation. These first-modulated values are used by a mapper that maps the values to selected dimension values. And, the selected dimension values into which the first-modulated values are mapped are used to select biorthogonal code values.

20 Claims, 3 Drawing Sheets

APPARATUS, AND ASSOCIATED METHOD, FOR CODING AND DECODING MULTI-DIMENSIONAL BIORTHOGONAL CODES

The present invention relates generally to a manner by which to encode, and correspondingly decode, data communicated during operation of a communication system, such as a cellular radio communication system. More particularly, the present invention relates to apparatus, and an associated method, by which to form biorthogonal codes utilizable in a multi-dimensional modulation scheme. Biorthogonal coding in a dimension higher than that efficiently implementable pursuant to a conventional N/2 QAM (Quadrature Amplitude Modulation) scheme is permitted through operation of an embodiment of the present invention. Also, when received at a receiving station, recovery of the informational content of the received signal is more readily implemented.

BACKGROUND OF THE INVENTION

A communication system is formed, at a minimum, of a sending station and a receiving station interconnected by way of a communication channel. Data to be communicated by the sending station to the receiving station is converted into a form to permit its communication upon the communication channel to the receiving station. When received at the receiving station, the informational content of the data is recovered, or otherwise recreated, thereby to provide the receiving station with the data transmitted by the sending station.

In a radio communication system, the communication channel is formed of a radio channel, defined upon a portion of the electromagnetic spectrum. A wireline connection is not required to interconnect the sending and receiving stations of a radio communication system. Because a radio communication channel is used to effectuate the communication of data by the sending station to the receiving station, thereby obviating the need of a wireline connection therebetween, use of a radio communication system to communicate therethrough is of particular advantage when formation of the wireline connection would be inconvenient or impractical.

To convert the data to be communicated by the sending station in a radio communication system into a form to permit its communication upon a radio channel, a radio frequency (RF) carrier signal is combined together with the data to be communicated by the sending station in a modulation process. The data is sometimes referred to as being modulated upon the carrier signal. Once modulated, the resultant communication signal is of a form to permit its communication upon the radio channel formed between the sending and receiving stations.

A radio device which provides for both the sending station and a receiving station at a common unit is sometimes referred to as a radio transceiver. Two-way communication is permitted through the use of a radio transceiver.

A cellular communication system is exemplary of a multi-user radio communication system, usage of which has achieved wide popularity in recent years. A subscriber to a cellular communication system communicates therethrough by way of a radio transceiver, typically referred to as a mobile station. Mobile stations conventionally are constructed to mimic the operation of a conventional, wireline telephonic device. Because a radio link is formed between the mobile station and other portions of the cellular communication system, the need for a wireline connection to the mobile station is obviated. Communication by way of a cellular communication system is possible from locations at which formation of a wireline connection would be inconvenient or impractical.

In an ideal communication system, the communication channel formed between the sending and receiving stations does not distort the informational content of the data communicated thereon to the receiving station. However, in an actual communication system, the data is susceptible to distortion through, e.g., the introduction of Inter-Symbol Interference (ISI) fading, and interference caused by other co-generated signals and noise. Radio channels are particularly susceptible to such distortion.

Various manners have been developed by which to compensate for the distortion introduced upon the data when transmitted upon a non-ideal communication channel. Coding techniques, for instance, have been implemented, sometimes to increase the redundancy of the data so that, if portions of the data are distorted to an extent to prevent recovery thereof, the increased redundancy of the data shall still permit remaining portions of the data to be recovered, thereby to recover the informational content of the data.

Biorthogonal coding, for instance, is a manner by which to code data which is to be communicated during operation of a communication system. A biorthogonal code is a special class of lattice codes. Generally, a biorthogonal code is constructed by augmenting an orthogonal set of M/2 signals with the negatives of each signal. Biorthogonal codes are geometrically represented by the vertices of a hypercube in N dimensions. That is to say, the codes are constructed using N/2 unit vectors and their corresponding image vectors about an origin.

Conventionally, biorthogonal codes are used to perform waveform coding, a procedure by which to make each of the waveforms of a coded set of signals us unalike as possible. In other words, the goal of waveform coding is to render the cross-correlation amongst all pairs of signals as small as possible. And, the smallest possible values of cross-correlation occur when the signals are antipodal. Biorthogonal codes are optimal in terms of a distance property. Also, a codeword is implemented with a reduced number of bits relative to a conventional, orthogonal code.

A manner by which to implement biorthogonal coding in a higher-dimensional modulation scheme, such as one utilizing a N-dimensional spherical code, would advantageously improve communication quality in a communication system.

It is in light of this background information related to communication of data in a communication system that the significant improvements of the present invention have evolved.

SUMMARY OF THE INVENTION

The present invention, accordingly, advantageously provides a manner by which to form biorthogonal codes utilizable in a multi-dimensional scheme. Biorthogonal coding, and corresponding decoding of the biorthogonally-coded data, is provided during operation of a communication system, such as a cellular radio communication system, operable pursuant to an embodiment of the present invention.

Through operation of an embodiment of the present invention, biorthogonal coding in a dimension higher than that efficiently implementable pursuant to a convention N/2 QAM (Quadrature Amplitude Modulation) scheme is permitted. Also, when the biorthogonally-coded data is received at a receiving station, recovery of the informational content of the received signal is more readily implemented.

In one aspect of the present invention, apparatus is provided for a sending station in a communication system to implement a biorthogonal code at a sending station. Digital data is utilized to form biorthogonal codes which, subsequent to coding, are transmitted upon a communication channel to a receiving station. Coordinates for a signal constellation, values of which are utilized in the formation of the biorthogonal codes, are generated by a BPSK (Binary Phase Shift Keying) modulator. A BPSK modulator is readily implementable and values generated therefrom are used by a mapper to map the digital data to be communicated by the sending station to an appropriate dimensional value. Once mapped to the appropriate dimensional value, the coordinate is modulated onto an orthogonal dimension associated therewith. The orthogonal dimensions are summed together and then transmitted upon a communication channel.

In another aspect of the present invention, the coordinates are further rotated about one or more of the coordinate axes prior to modulation of the coordinates onto the orthogonal dimensions. By rotating the coordinates about the coordinate axes, a reduction in spurious emissions at the output of the transmit power amplifier of the sending station is facilitated. For instance, rotation of pairs of axes by 45° at each data transition until all combinations of pairs are exhausted, thereafter repeating for the remaining data transitions facilitates such reduction in spurious emissions.

In another aspect of the present invention, biorthogonally-coded data is decoded, once received at a receiving station. The inherent structure of the biorthogonally-coded data is utilized to provide a simple manner by which to decode the coded data received at the receiving station. At least a portion of the coordinates are zero for flat fading channels, and, therefore, an energy detector and a threshold comparator are sufficient to detect such portion of the bits of the biorthogonally-coded data. The receive signal is normalized to remove unwanted amplitude fluctuations which occur as a result of communication of the data upon a non-ideal channel and as a result of addition of multiple signals at the receiving station. Then, a squaring operation is performed to detect the energy of the coded data.

If the data is rotated prior to its transmission at a sending station, then the data must be derotated at the receiving station. That is to say, if the coordinate system used by the sending station is rotated prior to transmission of the data, then the receiving station must be modified to accommodate the rotated coordinate system. Soft decision outputs are used to derotate the coordinate system. Soft decisions are obtained by projecting portions of a receive signal onto each available orthogonal dimension, or, alternately, correlating the receive signal with each of the possible bases functions over a symbol period. The resulting soft decision outputs are derotated such that the original structure is restored.

In one implementation, biorthogonally-coded data is used in a cellular communication system in which Quadrature Quadrature Phase Shift Keying ($Q^2PSK$) is utilized in conjunction with an 8-ary biorthogonal code. In such an implementation, a 5.33 dB of coding gain over an uncoded 8-PSK system is provided while requiring only a limited increase in bandwidth to effectuate the system. A comparable system, for instance, would require the addition of a rate 2/3 convolutional encoder to an uncoded 8-PSK system. Asymptotic coding gains of 5.2 dB for a constraint length of 6 over an uncoded 8-PSK system is provided in the same bandwidth. However, for operating regions of interest, coding generally can be expected to provide between 2.9 and 4.2 dB of gain.

Thereby, a manner is provided by which to encode, and corresponding decode, data communicated during operation of the communication system. The coding, and corresponding decoding, is implemented in simple manner while providing the benefits of biorthogonal coding.

In these and other aspects, therefore, apparatus, and an associated method, is provided for a first communication station operable in a communication system having the first communication station and at least a second communication station. The first communication station is operable at least to transmit data to the second communication station. The apparatus, and associated method, codes the data prior to transmission thereof at the first communication station. A first modulator is coupled to receive indications of the data to be communicated by the first communication station. The first modulator modulates the indications of the data to form a first-modulated signal representative thereof. A mapper is coupled to the first modulator. The mapper maps at least a portion of the first-modulated signal formed by the first modulator to a selected dimension value selected from amongst a plurality of available dimension values. A second modulator is coupled to the mapper. The second modulator forms a second-modulated signal. The second-modulated signal is of a dimension responsive to the selected dimension value into which the mapper maps the portion of the first-modulated signal.

A more complete appreciation of the present invention and the scope thereof can obtained from the accompanying drawings, which are briefly summarized below, the following description of the presently-preferred embodiment of the invention, and the appended claims.

DETAILED DESCRIPTION OF THE PREFERRED EMBODIMENT

Figure 1:
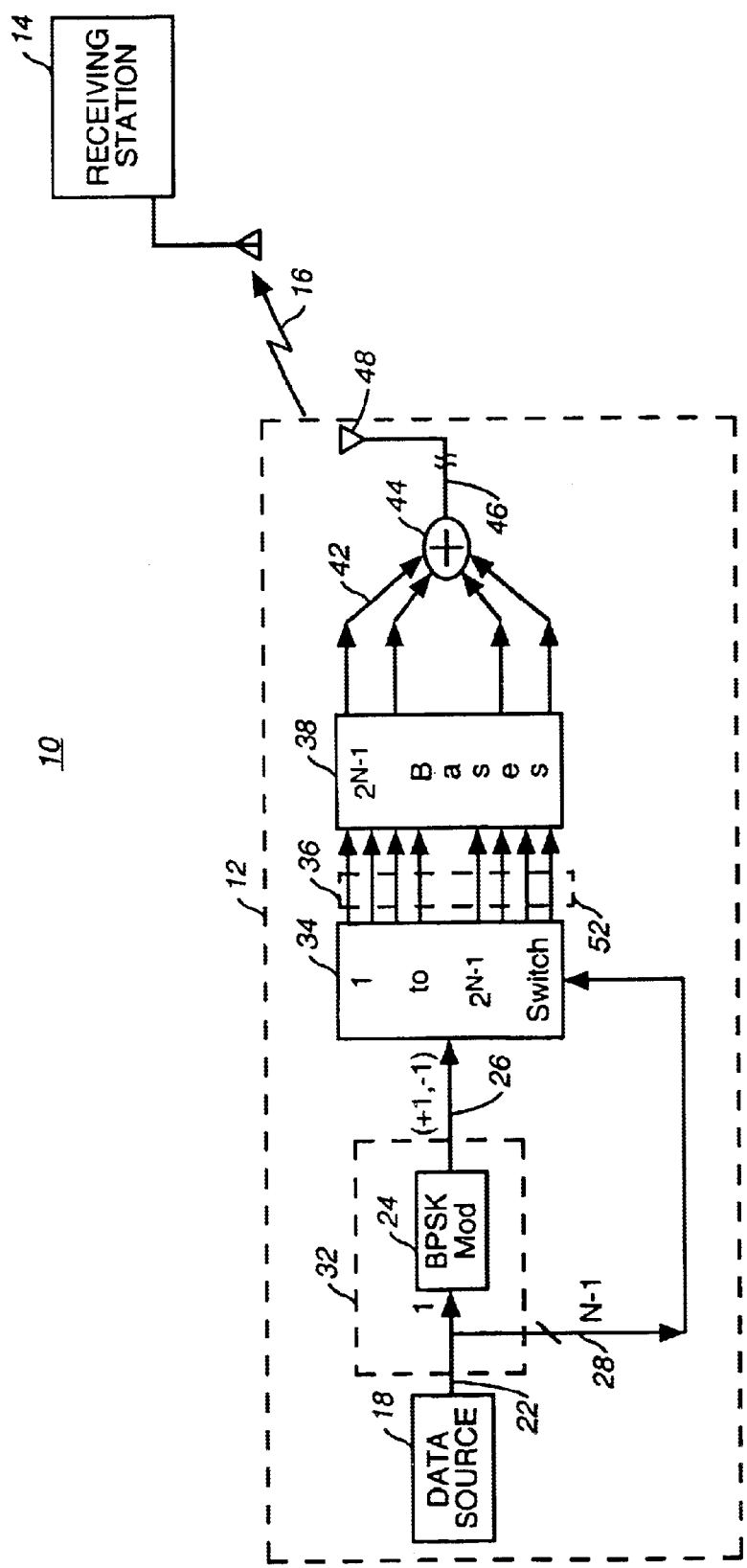
FIG. 1 illustrates a functional block diagram of a portion of a sending station operable in a communication system to send the biorthogonally-coded data to a receiving station.

Referring first to FIG. 1, a communication system, generally at 10, provides for the communication data between a sending station 12 and a receiving station 14. In the exemplary implementation, the communication system forms a cellular communication system in which the sending station 12 is formed of the transmit portion of a mobile station operable in the cellular communication system. And, the receiving station 14 is formed of the receive portion of a base transceiver station operable in the cellular communication system. In other implementations, other types of communication systems are represented by the communication system 10. In such other communication systems, the sending and receiving stations 12 and 14 operable therein are also operable pursuant to an embodiment of the present invention.

In the exemplary implementation in which the communication system forms a cellular communication system, the communication channel which interconnects the sending and receiving stations 12 and 14 is formed of a radio channel defined upon a radio link 16. While the radio link 16 is here shown to extend from the sending station 12 to the receiving station 14, in a cellular communication system which provides for two-way communications, the radio link provides radio channels for the communication of communication signals in both directions between the stations 12 and 14. And, appropriate structure is located at both the stations 12 and 14 to permit the two-way communication therebetween.

Data to be communicated by the sending station 12 is here formed at a data source 18. The data is comprised, for instance, of digital symbols formatted into groups. Each group is formed of N symbols including a most significant symbol, or bit, and N−1 least significant bits. Groups of the symbols of the data formed at the data source are generated on the line 22. The most significant bit of each group is applied to a BPSK (Binary Phase Shift Keying) modulator 24. The modulator 24 is operable to modulate the most significant bit of each group of symbols generated by the data source. A modulated signal is generated on the line 26. Because of the BPSK modulation of the symbol bit, the modulated signal is of a value of either +1 or −1.

The other bits, forming the least significant bits of each group of the symbols generated by the data source 18 is passed on the line 28. The line 28 passes N−1 bits of each group of symbol bits generated by the data source thereon. That is to say, the Nth bit is provided to the BPSK modulator 24 and the remaining ones of the bits are generated on the line 28. The BPSK modulator together with elements (not separately shown) utilized to segregate the bits into the separate paths, i.e., extending to the BPSK modulator 24 and extending on the line 28, together form a modulator element 32.

The lines 26 and 28 are coupled to a mapper formed of a switch element 34. The switch element 34 more particularly forms a 1-to-$2^{N-1}$ switch element. The switch element includes a plurality, $2^{N-1}$, of output lines 36 which are coupled to a device 38 forming a modulator containing a corresponding $2^{N-1}$ number of orthogonal dimensions.

The device 38 includes a plurality, $2^{N-1}$, of output lines 42 which are coupled to a summing element 44. Values generated on respective ones of the lines 42 are summed together to form a summed signal on the line 46. The line 46 is coupled to other circuitry (not shown) of the sending station, thereafter to be transduced by an antenna transducer 48 to be communicated upon the radio channel defined upon the radio link 16.

The apparatus shown in the Figure to form the sending station 12 is operable to implement biorthogonal coding. Biorthogonal coding results as only one antipodal component per dimension and coordinate position of the signal constellation associated with the coding is utilized.

The switch element 34 maps the values of the antipodal signal applied thereto to an appropriate dimension. As noted above, the most significant bit of each group of each group of symbol bits generated by the data source 18 determines the signal sign, either positive or negative, of the antipodal signal. The remaining ones of the bits of each group, formed on the line 28, are used to select the appropriate dimension to which the signal is mapped. Then, at the device 38, each coordinate, so-mapped, is modulated onto one of the plurality of orthogonal dimensions defined at the device.

In one implementation, and as noted by a rotator block 52, shown in dash, coordinates are rotated about any, or all, of the coordinate axes of the N-dimensional system. Rotation of coordinates facilitates reduction in spurious emissions generated during operation of the sending station. In the exemplary implementation in which the sending station forms the transmit portion of a mobile station, the sending station includes a power amplifier. Rotation of the coordinates by the rotator reduces spurious emissions at the output of the power amplifier. An exemplary rotation pattern effectuated by the rotator rotates pairs of axes by 45° at each data transition until all combinations of pairs have been exhausted. The rotation pattern thereafter repeats itself for the remaining data transitions.

Figure 2:
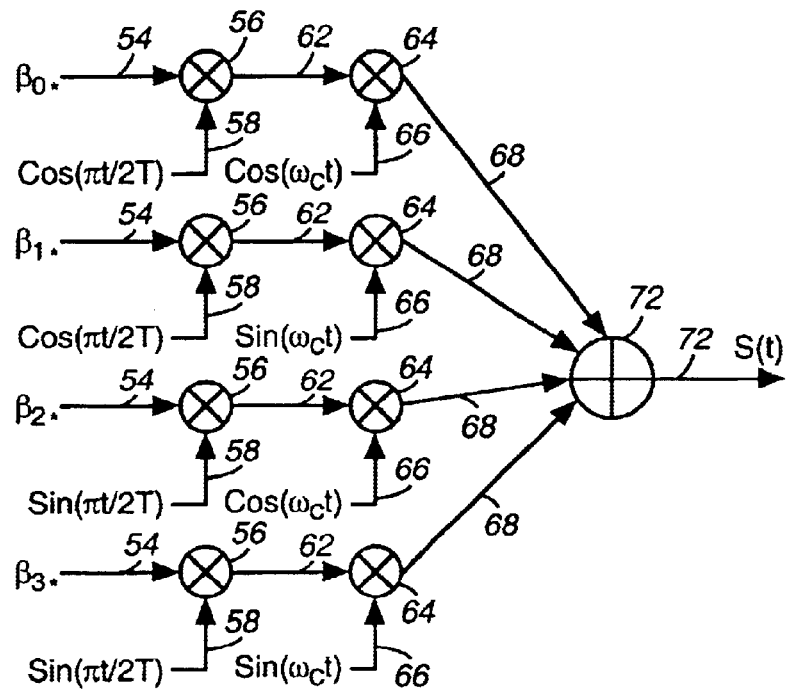
FIG. 2 illustrates a functional block diagram of a $Q^2PSK$ realization of a portion of the sending station shown in FIG. 1.

FIG. 2 illustrates a $Q^2PSK$ realization of biorthogonal coding effectuable pursuant to operation of an embodiment of the present invention. The $Q^2PSK$ realization, used in conjunction with an 8-ary biorthogonal code, exhibits advantageous spectral and power efficiencies. Here, successive components are applied by way of the lines 54 to mixer elements 56. Cosine and sine components, respectively, are also applied to the mixer elements, here by way of the lines 58. First-mixed signals are generated on the lines 62 and are applied to second mixer element 64. Cosine and sine waves are also applied, respectively, to the element 64, here by way of the lines 66. Second-mixed signals formed at the second mixer element 64 are generated on the lines 68 and summed together at a summer 72 to form a resultant signal.

Figure 3:
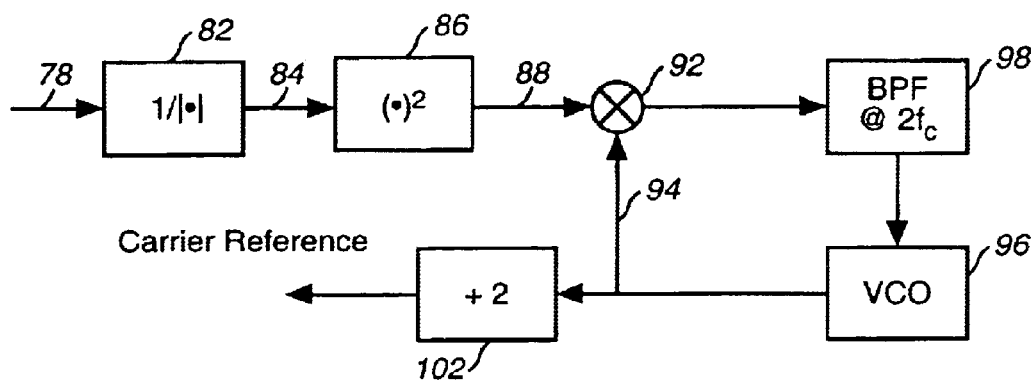
FIG. 3 illustrates a portion of a receiving station operable to receive biorthogonally-coded signals, such as biorthogonally-coded signals generated by the sending station shown in FIG. 1.

FIG. 3 illustrates a portion of the receiving station shown in FIG. 1 to form a portion of the communication system 10. A portion of the receiving station illustrated in the Figure is coupled to receive indications a receive signal received at the receiving station. Such indications are provided, by way of the line 78, to a normalizer 82. The normalizer 82 generates a normalized signal on the line 84 which is, in turn, provided to an energy detector 86. The energy detector generates a recovered signal on the line 88 which is applied to a mixer 92. A second input to the mixer 92 is applied thereto by way of the line 94. The line 94 is coupled to a voltage-controlled oscillator 96 which is coupled in a control loop with an output of the mixer 92, here by way of a bandpass filter 98. A divider element 102 also is illustrated in the Figure, coupled to receive the oscillating signal generated by the voltage-controlled oscillator.

Operation of the portion of the receiving station takes advantage of the inherent structure of the biorthogonal code generated by the sending station 12 (shown in FIG. 1). At least (N−t) of the coordinates of the receive signal are zero for flat-fading channel, wherein t is the number of transmit antennas utilized to transmit the send signal to the receiving station and received thereat.

Therefore, an energy detector and threshold comparator are sufficient to detect the "N−t" of the N bits. The threshold utilized by the threshold comparator is set, for instance, by utilizing a Neyman-Pearson criterion for maximizing the probability of signal detection while, at the same time, minimizing the probability of false detection. The remaining bit is coherently detected with a recovered carrier. As only non-zero entries of the coordinates are binary, a simple square law device, here the detector 86, is used to recover the carrier. The normalizer 82 normalizes the receive signal prior to squaring by the energy detector 86 to remove unwanted amplitude fluctuations resulting, e.g., during transmission of the signal upon the communication channel as well as addition of multiple signals at the receiver due to multi-path transmission.

If rotation of the coordinates due to rotation of the coordinate system prior to transmission at the sending station is performed, the receiving station includes corresponding structure to accommodate the new coordinate system. Rf-modulated, N soft decision outputs are needed to derotate the coordinate system using the N circuits of the type which shall be shown in, and described with respect to, FIG. 4, below. Soft decisions are obtained by projecting the receive signal onto each available orthogonal dimension or, equivalently, by correlating the receive signal with each of the possible basis functions over a symbol. The resulting N soft output decisions are then derotated such that the original structure is restored and, thereafter, the structure shown in FIG. 3 recovers the carrier. Also, the derotation can be performed digitally if the signal spectrum is converted to an intermediate frequency (IF) and digitized.

Figure 4:
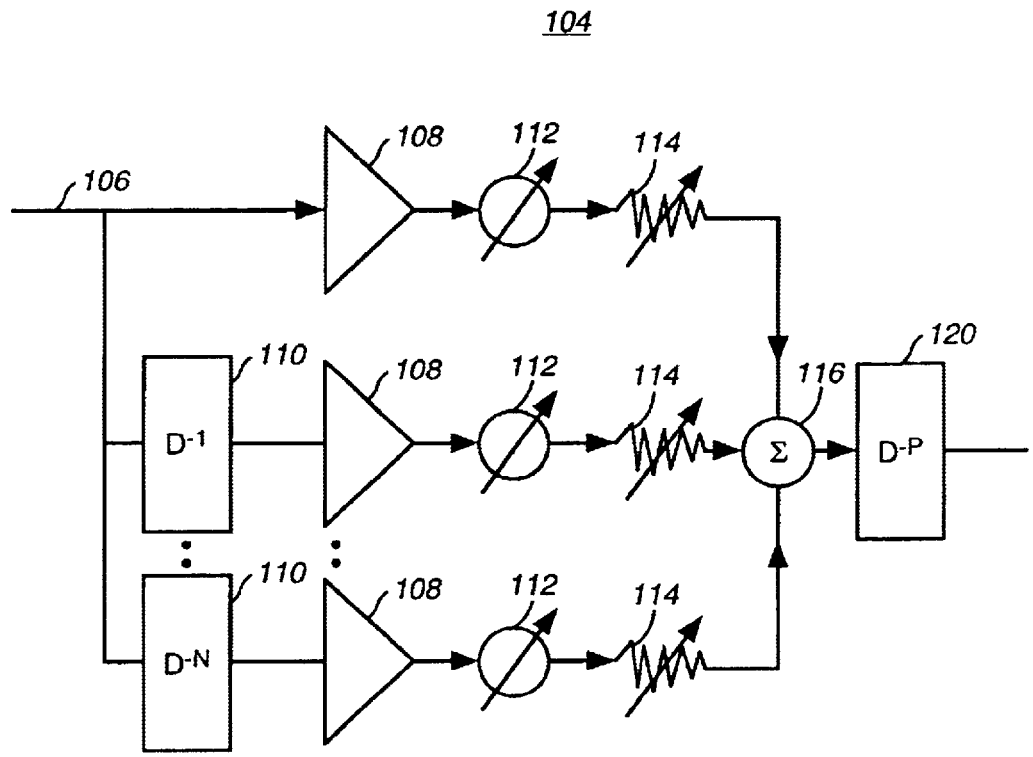
FIG. 4 illustrates a portion of a derotator forming a portion of a receceiving station operable pursuant to an embodiment of the present invention.

FIG. 4 illustrates a derotator 104 forming a portion of the receiving station of an embodiment of the present invention. The derotator is operable to derotate a rotated signal received at the receiving station. Here, indications of the receive signal are applied by way of the line 106 to gain elements 108. Delay elements 110 are positioned in-line with successive ones of the gain elements and provide one to N unit symbol delays, as appropriate.

Output terminals of each of the gain elements 108 are coupled to digital controlled variable phase shifters 112, operable to shift the phases of the signals applied thereto. And, each of the shifters 112 is coupled to a digitally-controlled, stepped attenuator 114 which selectably attenuates the signals applied thereto. The attenuated signals formed by each of the attenuators are combined by a summing element 116 which forms a summed signal on the line 118 which is provided to a deleay element 120. The element 120 generates a signal on the line 78. The line 78 is coupled to additional receiving-station elements, shown in FIG. 3.

Noise power is also estimable by taking advantage of the (N–t) values. Any energy detected in such dimensions provides an estimate of the noise power. An estimate of the signal-to-noise ratio per symbol is as follows:

$$\sigma_N = \frac{1}{N-t} \sum_{t \in \Omega} \beta t,$$

$$\sigma_S = \frac{1}{N-t} \sum_{t \in \Omega^P} \beta t^e,$$

Wherein:

$\Omega$ is a set of orthogonal dimensions that contain only noise components;

$\Omega^P$ is a set of orthogonal dimensions that contain signal plus noise components;

$\beta_t$ is the energy detected over an orthogonal base t of $N_j$; and $\delta_N$ and $\delta_S$ are the estimates of the power in the set $\Omega$ and $\Omega^P$.

Thereby, an estimate of the signal-to-noise ratio, per symbol $\gamma$ is given by:

$$\gamma = \frac{\sigma_S}{\sigma_N} - 1.$$

Figure 5:
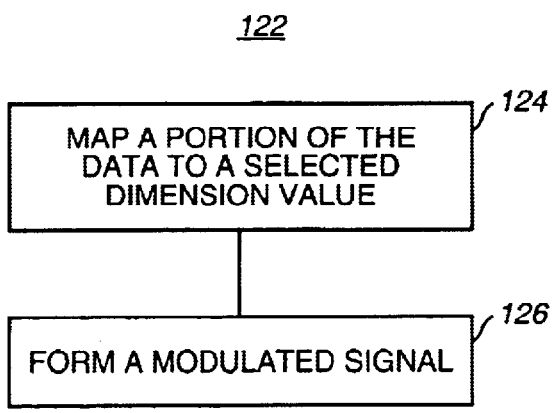
FIG. 5 illustrates a method flow diagram listing a method of operation of an embodiment of the present invention.

FIG. 5 illustrates a method, shown generally, at 122, of an embodiment of the present invention by which to load data prior to transmission thereof at a first communication station.

First, and as indicated by the block 124, at least a portion of an indication of the data to be transmitted is mapped to a selected dimension value selected from amongst a plurality of available dimension values. Then, and as indicated by the block 126, a modulated signal is formed. The modulated signal is of a dimension responsive to the selected dimension value into which the indications of the data are mapped.

Thereby, through operation of an embodiment of the present invention, biorthogonal coding in a dimension higher than that efficiently implementable pursuant to a conventional N/2 QAM scheme is permitted.

The previous descriptions are of preferred examples for implementing the invention, and the scope of the invention should not necessarily be limited by this description. The scope of the present invention is defined by the following claims.

We claim:

1. Apparatus for a communication system having a first communication station, the first communication station at least operable to transmit data upon a communication channel, said apparatus for the first communication station for coding the data prior to transmission thereof at the first communication station, said apparatus comprising:

a first modulator coupled to receive indications of the data to be communicated by the first-communication station, said first modulator for modulating the indications of the data to form a first-modulated signal representative thereof, the first-modulated signal forming an antipodal signal, the antipodal signal selected from an antipodal value set;

a mapper coupled to said first modulator, said mapper for mapping at least a portion of the first antipodal signal, selected from the antipodal value set and formed of the first-modulated signal formed by said first modulator, to a selected dimension value selected from amongst a plurality of available dimension values, the selected dimension value selected responsive to the antipodal signal;

a second modulator coupled to said mapper, said second modulator containing a set of substantially orthogonal bases, the substantially orthogonal bases of the set corresponding in dimension to the available dimension values of the plurality from amongst which said mapper selects the selected dimension value into which the first antipodal signal formed of the first-modulated signal to be mapped, said second modulator for forming a second-modulated signal, the second-modulated signal of a dimension responsive to the selected dimension value into which said mapper maps the portion of the first-modulated signal, the second-modulated signal forming biorthogonal codes defined by the substantially orthogonal bases that define multiple dimensional modulated data for transmission upon the communication channel.

2. The apparatus of claim 1 further comprising a rotator coupled between said mapper and said second modulator, said rotator for rotating the selected dimension value into which said mapper maps the at least the portion of the first-modulated signal.

3. The apparatus of claim 1 wherein the communication system further comprises a second communication station, said apparatus further for decoding the data transmitted by the first communication station to the second communication station, said apparatus comprising:

an energy detector coupled to receive indications of the data transmitted by the first communication station and received at the second communication station, said energy detector for detecting energy levels of the indications, thereby to determine values representative of the data.

4. The apparatus of claim 3 wherein said energy detector comprises:

a normalizer coupled to receive the indications of the data received at the second communication station, said normalizer for normalizing the indications of the data and for generating a normalized representation thereof; and a square-law device coupled to receive the normalized representations generated by said normalizer, said square-law device for forming a squared representation of the normalized representation of the indications of the data.

5. The apparatus of claim 4 wherein coordinates of the data are rotated prior to transmission thereof by the first communication station and wherein said apparatus further comprises a derotator for derotating the indications of the data received at the second communication station.

6. A method for communicating in communication system having a first communication system and at least a second communication station, the first communication station at least operable to transmit data to the second communication station, said method for coding the data prior to transmission thereof at the first communication station, said method comprising:

modulating indications of the data pursuant to a binary phase shift keying modulation scheme to form first-modulated values;

mapping indications representative of at least a portion of the first-modulated values to a selected dimension value selected from amongst a plurality of available dimension values;

rotating at least the portion of the first-modulated signal mapped during said operation of mapping;

forming a second-modulated signal of a dimension responsive to the selected dimension value into which the indications are mapped during said operation of mapping, the second-modulated signal forming biorthogonal codes defined by substantially orthogonal bases that define multiple dimensional modulation data for transmission to the second communication station;

derotating the second-modulated signal once received at the second communication station;

normalizing the indications of the data, once derotated during said operation of derotating, and generating a normalized representation thereof; and forming a squared representation of the normalized representation of the indications of the data.

7. The method of claim 6 further comprising the additional operation of combining together successive portions of the modulated signal formed during said operation of forming.

8. The method of claim 6 wherein said operation of forming the second-modulated signal comprises assigning an orthogonal base of a set of substantially orthogonal bases to form the modulated signal.

9. The method of claim 8 wherein said operation of assigning is made responsive to the dimension value into which the indication is mapped during said operation of mapping.

10. Apparatus for a communication system having a first communication station and at least a second communication station, the first communication station at least operable to transmit data to the second communication station, said apparatus for coding the data at the first communication station prior to transmission thereof and for decoding the data at the second communication station, said apparatus comprising:

a first modulator coupled to receive indications of the data to be communicated by the first communication station, said first modulator for modulating the indications of the data to form a first-modulated signal representative thereof;

a mapper coupled to said first modulator, said mapper for mapping at least a portion of the first-modulated signal formed by said first modulator to a selected dimension value selected from amongst a plurality of available dimension values;

a rotator coupled to said mapper, said rotator for rotating the at least the portion of the first-modulated signal mapped by said mapper;

a second modulator adapted to receive the at least the portion of the first-modulated signal once rotated by said rotator, said second modulator for forming a second-modulated signal, the second-modulated signal of a dimension responsive to the selected dimension value into which said mapper maps the portion of the first-modulated signal;

a derotator embodied at the second communication station, said derotator for derotating the second modulated signal once received at the second communication station;

a normalizer coupled to receive indications of the second-modulated signal, once derotated by said derotator, said normalizer for normalizing the indications of the data and for generating a normalized representation thereof; and a square-law device coupled to receive the normalized representations generated by said normalizer, said square-law device for forming a squared representation of the normalized representation of the indications of the data.

11. The apparatus of claim 10 further comprising a summer coupled to said second modulator, said summer for summing together successive portions of the second-modulated signal formed by said second modulator, thereby to form a summed signal suitable for transmission upon the communication channel.

12. The apparatus of claim 10 wherein the first-modulated signal generated by said first modulator is of values selected from an antipodal value set.

13. The apparatus of claim 12 wherein said first modulator comprises a BPSK (Binary Phase Shift Keying) modulator.

14. The apparatus of claim 13 wherein the antipodal value set from which values generated by said BPSK modulator are selected comprise a logical positive one value and a logical negative one value.

15. The apparatus of claim 10 wherein the first-modulated signal is formed of successive groups of signal values, each group defining a most significant signal value and at least one least significant signal value.

16. The apparatus of claim 15 wherein the selected dimension value into which said mapper maps the portion of the first-modulated signal is responsive to values of the most significant bit and of the at least one least significant bit.

17. The apparatus of claim 16 wherein the most significant bit of each group of signal values is determinative of whether the portion of the first-modulated signal is to be of a positive value and wherein the at least one least significant bit is determinative of to which dimension value the portion of the first-modulated signal is mapped.

18. The apparatus of claim 17 wherein said mapper comprises a functional single-throw, multiple-pole switch element.

19. The apparatus of claim 18 wherein said switch element comprises a one-to-$2^{N-1}$ switch.

20. The apparatus of claim 10 wherein the communication system comprises a cellular radio communication system operable pursuant to a $Q^2$PSK (Quadrative Quadrature Phase Shift Keying) communication scheme, and wherein said second modulator comprises bases corresponding to an 8-ary biorthogonal code.

* * * * *